US007068464B2

(12) United States Patent
Dee

(10) Patent No.: US 7,068,464 B2
(45) Date of Patent: Jun. 27, 2006

(54) DOUBLE SIDED MAGNETIC TAPE

(75) Inventor: Richard H. Dee, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 296 days.

(21) Appl. No.: 10/394,876

(22) Filed: Mar. 21, 2003

(65) Prior Publication Data

US 2004/0184175 A1 Sep. 23, 2004

(51) Int. Cl.
*G11B 5/02* (2006.01)

(52) U.S. Cl. ........................................ 360/90; 360/134

(58) Field of Classification Search .................. 360/90, 360/17, 134, 55; 428/694 BA, 694 BM
See application file for complete search history.

(56) References Cited

U.S. PATENT DOCUMENTS 4,323,621 A * 4/1982 Kober et al. ................ 428/216
4,743,490 A * 5/1988 Fayling ...................... 428/212
5,069,934 A 12/1991 Chino et al.
5,156,908 A 10/1992 Araki et al.
5,293,285 A 3/1994 Leonhardt et al.
5,643,686 A 7/1997 Isshiki et al.
5,850,328 A * 12/1998 Leonhardt et al. .......... 360/134
6,101,059 A 8/2000 Wong et al.
6,818,298 B1 * 11/2004 Lowery et al. ............. 428/403
6,835,450 B1 12/2004 Veitch et al.
6,940,672 B1 * 9/2005 Stubbs et al. ................. 360/55
2003/0228498 A1 * 12/2003 Bradshaw ............. 428/694 TS

FOREIGN PATENT DOCUMENTS

EP 1 026 666 A 8/2000
JP 2000315312 11/2000

* cited by examiner

*Primary Examiner*—Brian E. Miller
(74) *Attorney, Agent, or Firm*—Brooks Kushman P.C.

(57) ABSTRACT

Magnetic tape onto which information may be recorded on either side exhibits the risk of having information recorded on one side affect the opposite side when the two sides are adjacent, such as when the tape is wound in a tape pack. The chance that information recorded onto one surface of a double sided magnetic tape will affect information recorded on the other surface of the magnetic tape is reduced by keeping fields emanating from a recorded region less than about one-half the coercivity of the magnetic medium onto which the information is recorded.

7 Claims, 2 Drawing Sheets

DOUBLE SIDED MAGNETIC TAPE

BACKGROUND OF THE INVENTION

1. Field of the Invention

The present invention relates to magnetic tape onto which information may be recorded on both sides.

2. Background Art

Magnetic tape continues to be a popular means for recording and storing information.Magnetic tape storage systems may hold vast quantities of data at a relatively low cost per bit stored.Magnetic tapes are easily manipulated by automated storage systems. Data may be added to information already stored on a magnetic tape. In addition, magnetic tapes may be erased and rerecorded. Finally, magnetic tape has a long shelf life under proper storage conditions.

Magnetic tape and tape storage systems may be made increasingly more efficient and cost-effective by increasing the data storage density. Traditionally, increases in storage density have resulted from narrower data tracks, increasing the number of data tracks per tape width, increasing the density of data recorded along the length of each track, and the like. These increases have resulted from improvements in one or more of magnetic media, tape thickness, read and record electronics, tape head positioning, data encoding and decoding schemes, and the like. However, all of these improvements have focused on the traditional tape configuration of a supportive web onto which one side is coated with magnetic material.

A doubling of information density can be achieved if both sides of the supporting web are coated with magnetic material onto which information may be recorded and from which information can be retrieved. One difficulty with such double sided recording occurs when the tape is wound into a cassette or cartridge for storage. Unlike traditional, one-sided tape where magnetic media contacts the non-magnetic backside of tape as the tape is wound around a hub, a double sided tape places magnetically coated tape sides face-to-face. This may result in magnetic regions recorded on one side affecting the information stored on an adjacently facing side.

What is needed is a double sided magnetic tape which greatly reduces the risk that magnetic regions recorded onto the tape will affect facing regions when the tape is wound into a cartridge or cassette.

SUMMARY OF THE INVENTION

The present invention reduces the possibility that data recorded onto one surface of a double sided magnetic tape will affect data recorded on the other surface of the magnetic tape when the tape surfaces are adjacent by keeping fields emanating from a recorded region less than about one-half the coercivity of the magnetic medium onto which the data is recorded.

A magnetic tape for storing digital data is provided. A first side of the magnetic tape is coated with a first side magnetic coating operative to have data recorded thereon. A second side of the magnetic tape opposite of the first side is coated with a second side magnetic coating operative to have data recorded thereon. Each of the first side magnetic coating and the second side magnetic coating has a set coercivity. Data is recorded on the magnetic tape first side to have a fringe field strength no greater than one-half the set coercivity of the second side. Data is also recorded on the magnetic tape second side to have a fringe field strength no greater than one-half the set coercivity of the first side.

In an embodiment of the present invention, the set coercivity is at least 1800 Oe.

In another embodiment of the present invention, each of the first side magnetic coating and the second side magnetic coating has a remanence of not more than 600 memu/cm$^3$.

In yet another embodiment of the present invention, each of the first side magnetic coating and the second side magnetic coating is not greater than 120 nm in thickness.

In still another embodiment of the present invention, each of the first side magnetic coating and the second side magnetic coating has a magnetic strength not greater than 6 memu/cm$^2$.

In a further embodiment of the present invention, each of the first side magnetic coating and the second side magnetic coating has a coercive squareness of at least 0.7.

In a still further embodiment of the present invention, each of the first side magnetic coating and the second side magnetic coating has a remanent squareness of at least 0.7.

A system for recording data is also provided. The system includes a magnetic tape recordable on both the first side and the second side. Each of the first side and the second side is coated with a material having a set coercivity. The system includes a first record module for recording data on the first side and a second record module for recording data on the second side. At least one hub receives the magnetic tape in a tape pack with the first side in contact with the second side. Data is recorded on the first side and on the second side to have a field strength no greater than one-half the set coercivity.

The above objects and other objects, features, and advantages of the present invention are readily apparent from the following detailed description of the preferred embodiments when taken in connection with the accompanying drawings.

DETAILED DESCRIPTION OF THE PREFERRED EMBODIMENTS

Figure 1A:
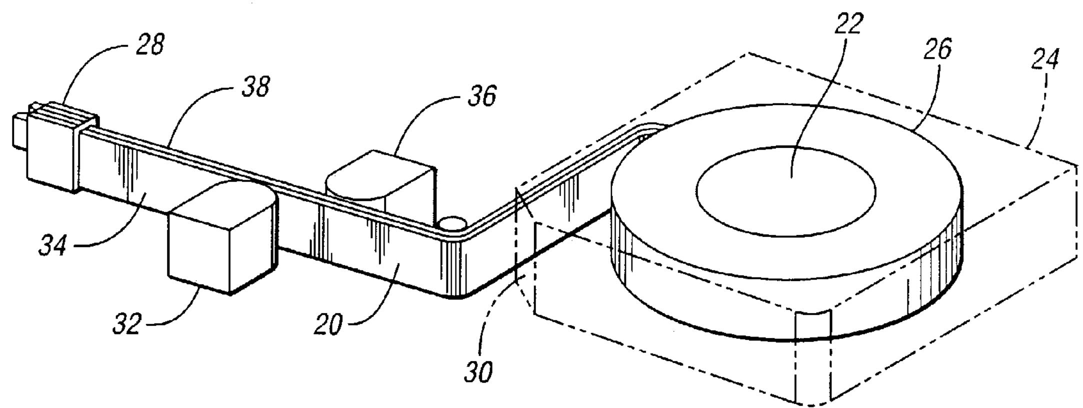
FIGS. 1*a* and 1*b* are schematic diagrams illustrating magnetic tape according to an embodiment of the present invention.
Figure 1B:
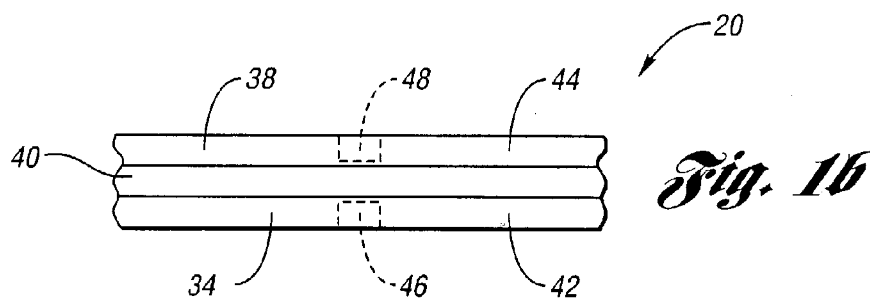

Referring to FIGS. 1*a* and 1*b*, diagrams illustrating magnetic tape according to an embodiment of the present invention are shown. FIG. 1*a* illustrates a perspective view and FIG. 1*b* a cross-sectional view of magnetic tape 20. Magnetic tape 20 is wound on hub or spool 22 within cartridge 24 to form tape pack 26. One end of tape 20 is affixed to leader block 28. When tape 20 is fully wound within cartridge 24, leader block 28 is positioned near opening 30 in one corner of cartridge 24. In operation, leader block 28 is pulled away from cartridge 24 and around components in a tape deck so that tape 20 may be recorded to and/or read from. Such components include first module 32 for recording data onto tape first side 34 and second module 36 for recording data onto tape second side 38.Modules 32, 36 convert electrical signals into magnetic fields which produce residual effects on regions of tape sides 34, 38, respectively.

Magnetic tape 20 consists of flexible substrate 40 on which has been deposited two recording surfaces. The two recording surfaces comprise first magnetic coating 42 on tape first side 34 and second magnetic coating 44 on tape second side 38. During the record process, regions of magnetization 46, 48 are formed in magnetic tape 20 by record modules 32, 36, respectively. Regions of magnetization 46, 48 are recorded to have field strength no greater than one-half the coercivity of magnetic coatings 42, 44. Thus, if tape first side 34 is in contact with tape second side 38 such that region of magnetization 46 is adjacent to region of magnetization 48, region of magnetization 46 will not have a significant effect on region of magnetization 48 and region of magnetization 48 will not have a significant effect on region of magnetization 46.

Figure 2:
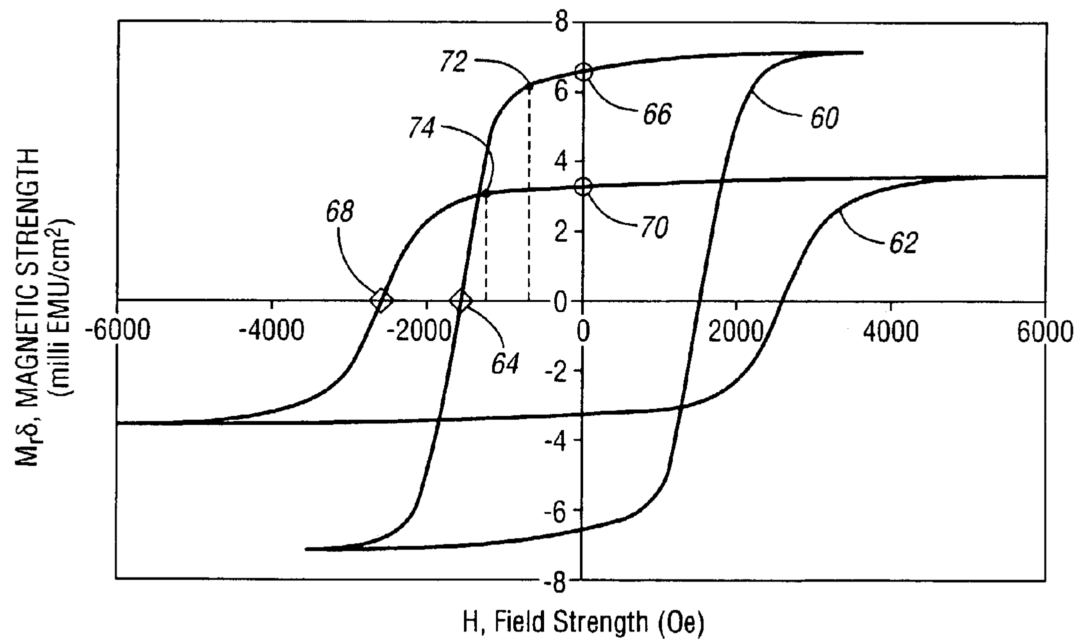
FIG. 2 is an M-H graph illustrating hysteresis curves for two magnetic tape media in accordance with an embodiment of the present invention.

Referring now to FIG. 2, an M-H graph illustrating hysteresis curves for two magnetic tape media in accordance with an embodiment of the present invention are shown. A first hysteresis loop, indicated by 60, has a coercivity, indicated by 64, of approximately 1700 Oe and a remanent magnetic strength, indicated by 66, of approximately 6.5 memu/cm$^2$. A second hysteresis loop, indicated by 62, is from a magnetic material exhibiting a flatter curve. Second hysteresis loop 62 has a coercivity, indicated by 68, of approximately 2600 Oe and a remanent magnetic strength, indicated by 70, of approximately 3.5 memu/cm$^2$.

The effects of having a field strength no greater than one-half the coercivity 64, 68 can be readily examined from hysteresis curves 60, 62. Considering first hysteresis curve 60, a field having half the strength of coercivity 64 creates a movement along hysteresis loop 60 from remanent magnetic strength 66 to point 72. Since point 72 is still high on the knee of hysteresis curve 60, there will be very little effect on information recorded onto media exhibiting characteristics represented by hysteresis loop 60.

The effect of having a first tape side with a recorded region emitting a magnetic field placed adjacent to a second tape side susceptible to that field is reduced by magnetic material exhibiting characteristics resulting in hysteresis loop 62. A field strength of one-half coercivity 68 results in movement along hysteresis curve 62 from remanent magnetic strength 70 to point 74 well before the knee in hysteresis loop 62. Thus, virtually no change will occur to data recorded on a tape surface exhibiting characteristics represented by hysteresis loop 62.

One or more of several parameters may be limited to improve the characteristics of a magnetic coating so as to result in a hysteresis loop more similar to plot 62 than to plot 60. First, the coercivity may be set to at least 1800 Oe. Second, the magnetic coating may be chosen to have a magnetic strength not greater than 6 memu/cm$^2$. Remanence is related to remanent magnetic strength by the magnetic coating thickness. Limiting the magnetic coating to a thickness not greater than 120 nm lowers the magnetic strength to that shown in hysteresis loop 62. Improvements in performance may also be achieved by limiting the remanence to not more than 600 memu/cm$^3$.

Figure 3:
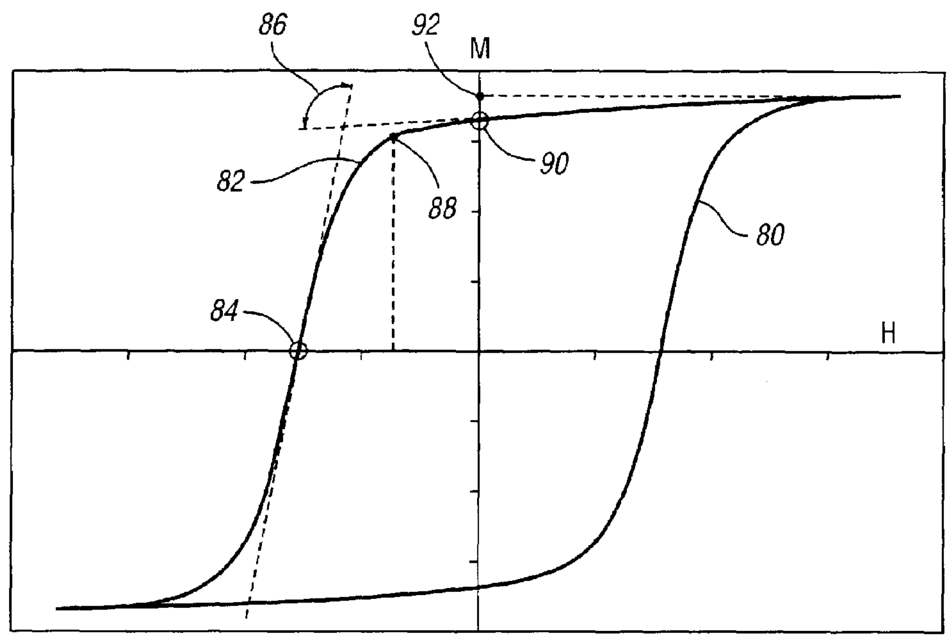
FIG. 3 is an M-H graph illustrating calculation of squareness according to an embodiment of the present invention.

Referring now to FIG. 3, an M-H graph illustrating calculation of squareness according to an embodiment of the present invention is shown. Improvements in performance are also achieved by increasing the squareness of the hysteresis loop. As illustrated in generalized hysteresis plot 80, modifying characteristics of a magnetic media such that knee 82 moves closer in the horizontal direction to coercivity 84 has the effect of bringing angle 86 closer to 90°. Increasing the squareness results in decreasing the effect of a field strength at one-half coercivity 84, indicated by 88, by shifting point 88 higher on hysteresis loop 80.

One measure of squareness is the coercive squareness CS, as expressed in Equation (1).

$$CS = \frac{aH_c - M_r}{aH_c} \tag{1}$$

The value a is the slope of hysteresis curve 80 at coercivity 84. The value $H_c$ is coercivity 84. The value $M_r$ is the remanence of the magnetic coating at zero applied field, indicated by 90. Preferably, the coercive squareness should be at least 0.7.

Another measure of squareness is the remanent squareness, RS, as expressed in Equation (2).

$$RS = \frac{M_r}{M_s} \tag{2}$$

The value $M_r$ is remanence 90. Saturation magnetization,$M_s$, is the maximum magnetization attained at a very high applied magnetic field ($H>H_c$).Measurement may be read by running a horizontal (zero slope) line back to the M axis. Preferably, the remanent squareness should be at least 0.7.

Figure 4:
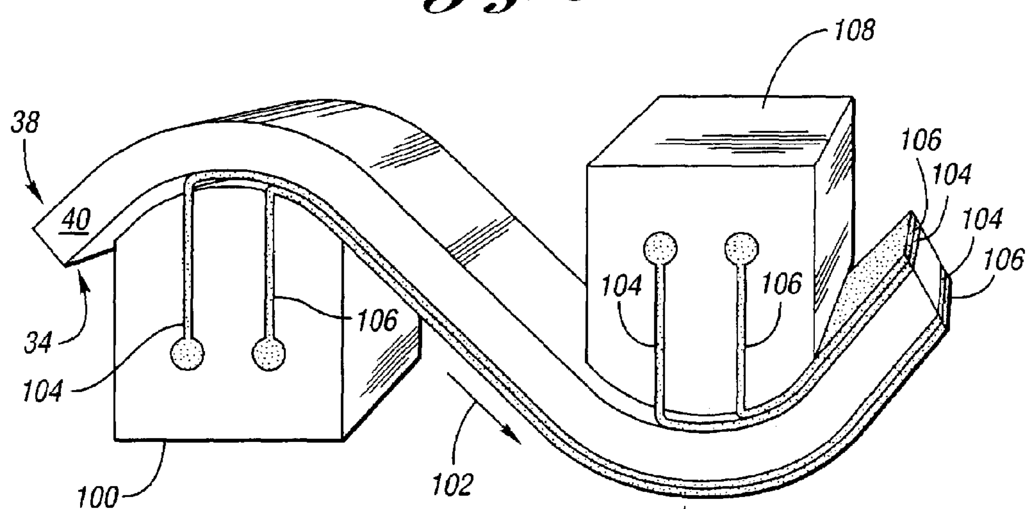
FIG. 4 is a schematic diagram illustrating manufacture of a double sided tape according to an embodiment of the present invention.

Referring now to FIG. 4, a schematic diagram illustrating manufacture of a double sided tape according to an embodiment of the present invention is shown. Substrate 40 may comprise any flexible material or coating such as polyethylene teraphalate (PET), polyethylene napthalate (PEN), ARAMID, PbO, and the like. Substrate 40 is pulled past first coating head 100 in direction 102. First coating head 100 injects under-layer 104 onto substrate 40 and magnetic coating 106 onto under-layer 104. Under-layer 104 provides a smooth surface onto which magnetic coating 106 may be deposited.Magnetic coating 106 comprises magnetic particles mixed with a polymeric binder. Preferably, the magnetic particles are filtered to include particles of similar size. Similarly sized particles improve the squareness of hysteresis loop 80. Substrate 40 is also pulled past second coating head 108 which deposits under-layer 104 and magnetic coating 106 on second side 38. A coating process disclosing suitable coating heads for manufacturing double sided magnetic tape 20 is described in U.S. Pat. No. 5,069,934 to Chino et al., which is incorporated by reference herein.

Figure 5:
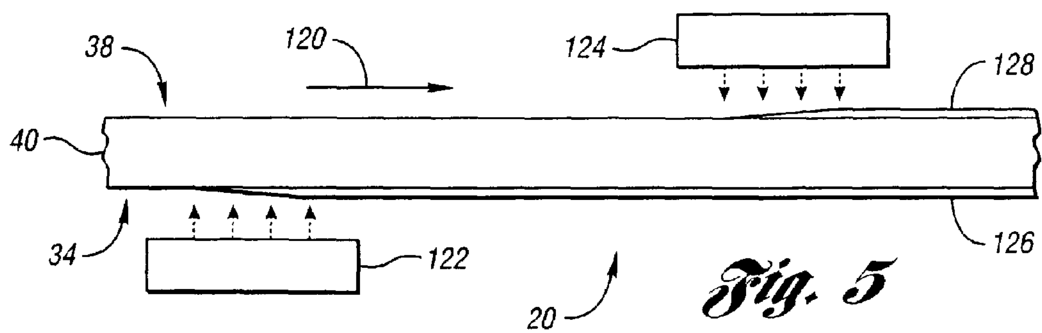
FIG. 5 is a schematic diagram illustrating an alternative manufacture of a double sided tape according to an embodiment of the present invention.

Referring now to FIG. 5, a schematic diagram illustrating an alternative manufacture of a double sided tape according to an embodiment of the present invention is shown. Substrate 40 is pulled in direction 120 through a vacuum environment past magnetic film material sources 122, 124. Sources 122, 124 expel magnetic material through a vapor deposition method such as sputtering, evaporation, or the like. First magnetic film material source 122 deposits magnetic film 126 on tape first side 34. Similarly, second magnetic film material source 124 deposits magnetic film 128 on tape second side 38.Magnetic properties of films 126, 128 depend on grain size distribution and film thickness. These parameters may be controlled by magnetic material composition, the speed of substrate 40 past sources 122, 124, the use of seed layers such as chromium on tape first side 34 and tape second side 38, deposition parameters, and the like.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for recording data comprising:

a magnetic tape recordable on both a first side and a second side, each of the first side and the second side coated with a material having a set coercivity;

a first record module for recording data on the first side;

a second record module for recording data on the second side; and at least one hub operative to wind the magnetic tape in a tape pack with the first side in contact with the second side;

wherein data is recorded on the first side and data is recorded on the second side to have a field strength no greater than one half the set coercivity.

2. A system for recording data as in claim 1 wherein the set coercivity is at least 1800 Oe.

3. A system for recording data as in claim 1 wherein the material coating each of the first side and the second side has a remanence not more than 600 memu/cm$^3$.

4. A system for recording data as in claim 1 wherein the material coating each of the first side and the second side is not greater than 120 nm in thickness.

5. A system for recording data as in claim 1 wherein the material coating each of the first side and the second side has a magnetic strength not greater than 6 memu/cm$^2$.

6. A system for recording data as in claim 1 wherein the material coating each of the first side and the second side has a coercive squareness CS of at least 0.7, the coercive squareness defined as $$CS = \frac{aH_c - M_r}{aH_c}$$

with α a slope dM/dH of a hysteresis loop for the material coating each of the first side and the second side measured at coercivity $H_c$ and with $M_r$ a remanence of the material coating each of the first side and the second side at H=0.

7. A system for recording data as in claim 1 wherein the material coating each of the first side and the second side has a remanent squareness RS of at least 0.7, the remanent squareness defined as $$RS = \frac{M_r}{M_s}$$

with $M_r$ a remanence of the material coating each of the first side and the second side at H=0 and $M_s$ is the saturation magnetization.

* * * * *